United States Patent
Bromberg et al.

(10) Patent No.: US 8,613,782 B2
(45) Date of Patent: Dec. 24, 2013

(54) REGENERATOR FOR SYNGAS CLEANUP AND ENERGY RECOVERY IN GASIFIER SYSTEMS

(75) Inventors: Leslie Bromberg, Sharon, MA (US); Daniel R. Cohn, Cambridge, MA (US); Jeffrey E. Surma, Richland, WA (US); James A. Batdorf, Kennewick, WA (US); David A. Lamar, West Richland, WA (US)

(73) Assignee: Inentec Inc., Richland, WA (US)

( * ) Notice: Subject to any disclaimer, the term of this patent is extended or adjusted under 35 U.S.C. 154(b) by 408 days.

(21) Appl. No.: 12/786,998

(22) Filed: May 25, 2010

(65) Prior Publication Data

US 2011/0126460 A1     Jun. 2, 2011

Related U.S. Application Data

(60) Provisional application No. 61/181,099, filed on May 26, 2009.

(51) Int. Cl.
*B01J 7/00* (2006.01)

(52) U.S. Cl.
USPC .............................................................. 48/61

(58) Field of Classification Search
None
See application file for complete search history.

(56) References Cited

U.S. PATENT DOCUMENTS

| | | | |
|---|---|---|---|
| 3,611,366 A | 10/1971 | Hewlett | |
| 3,841,239 A | 10/1974 | Nakamura et al. | |
| 4,007,015 A | 2/1977 | Barber | |
| 4,060,913 A | 12/1977 | Yoshida et al. | |
| 4,238,634 A | 12/1980 | Krogsrud | |
| 4,431,612 A | 2/1984 | Bell et al. | |
| 4,457,002 A | 6/1984 | Mathgen et al. | |
| 4,769,045 A | 9/1988 | Grindley | |
| 5,143,000 A | 9/1992 | Camacho | |
| 5,179,129 A * | 1/1993 | Studer | 518/700 |
| 5,666,891 A | 9/1997 | Titus et al. | |
| 5,811,752 A | 9/1998 | Titus et al. | |

(Continued)

FOREIGN PATENT DOCUMENTS

| | | |
|---|---|---|
| JP | 2002-048321 | 2/2002 |
| WO | 2008/092964 A1 | 8/2008 |

(Continued)

OTHER PUBLICATIONS

International Search Report and Written Opinion of application No. PCT/US10/36250 mailed Dec. 13, 2010.

(Continued)

*Primary Examiner* — Imran Akram
(74) *Attorney, Agent, or Firm* — Dorsey & Whitney LLP

(57) ABSTRACT

A rotating heat regenerator is used to recover heat from the syngas at it exits the reactor vessel of a waste or biomass gasifier. In some embodiments, three or more streams are passed through the heat exchanger. One stream is the dirty syngas, which heats the rotating material. A second stream is a cold stream that is heated as it passes through the material. A third stream is a cleaning stream, which serves to remove particulates that are collected on the rotating material as the dirty syngas passes through it. This apparatus can also be used as an auto-heat exchanger, or it can exchange heat between separate flows in the gasifier process. The apparatus can also be used to reduce the heating requirement for the thermal residence chamber (TRC) used downstream from the gasification system.

14 Claims, 12 Drawing Sheets

(56) References Cited

U.S. PATENT DOCUMENTS

| | | |
|---|---|---|
| 5,847,353 A | 12/1998 | Titus et al. |
| 5,961,870 A | 10/1999 | Hogan |
| 6,004,384 A | 12/1999 | Caudle |
| 6,018,542 A | 1/2000 | Berger |
| 6,066,825 A | 5/2000 | Titus et al. |
| 6,200,430 B1 | 3/2001 | Robert |
| RE37,134 E | 4/2001 | Wilson |
| 6,298,651 B1 | 10/2001 | Iijima |
| 6,422,822 B1 | 7/2002 | Holmes |
| 6,466,605 B1 | 10/2002 | Wittle et al. |
| 6,514,469 B1 | 2/2003 | Kado et al. |
| 6,640,752 B1 | 11/2003 | Counterman |
| 7,037,484 B1 | 5/2006 | Brandenburg |
| 7,080,505 B2 | 7/2006 | Koermer et al. |
| 7,655,703 B2 | 2/2010 | Batdorf |
| 2001/0013308 A1 | 8/2001 | Wark et al. |
| 2004/0060915 A1 | 4/2004 | Maeda |
| 2004/0084294 A1 | 5/2004 | Hogan |
| 2007/0089283 A1 | 4/2007 | Wilson et al. |
| 2007/0261303 A1 | 11/2007 | Surma et al. |
| 2007/0289509 A1 | 12/2007 | Vera |
| 2008/0059093 A1 | 3/2008 | Bromberg et al. |
| 2008/0097137 A1 | 4/2008 | Chapman et al. |
| 2008/0135457 A1 | 6/2008 | Ridge |
| 2008/0251234 A1 | 10/2008 | Wilson et al. |
| 2009/0000190 A1 | 1/2009 | Surma et al. |
| 2009/0020456 A1 | 1/2009 | Tsangaris et al. |
| 2009/0133407 A1 | 5/2009 | Sawyer |
| 2010/0011664 A1* | 1/2010 | Ariyapadi et al. .............. 48/128 |
| 2010/0300871 A1 | 12/2010 | Batdorf et al. |
| 2011/0126461 A1 | 6/2011 | Bromberg et al. |

FOREIGN PATENT DOCUMENTS

| | | |
|---|---|---|
| WO | 2010/138494 A1 | 12/2010 |
| WO | 2010/138516 A1 | 12/2010 |
| WO | 2010/138629 | 12/2010 |
| WO | 2010/138629 A1 | 12/2010 |

OTHER PUBLICATIONS

Quapp, W. J., et al., "Waste Gasification—Test Results from Plasma Destruction of hazardous, electronic and medical wastes", International Thermal Treatment Technologies 2003 Conference, May 16, 2003, XP002611722, Orlando, Florida.

International Search Report and Written Opinion dated Sep. 15, 2010 in corresponding application (PCT/US10/36044).

International Search Report and Written Opinion dated Jul. 20, 2010 in co-pending application (PCT/US10/36085).

* cited by examiner

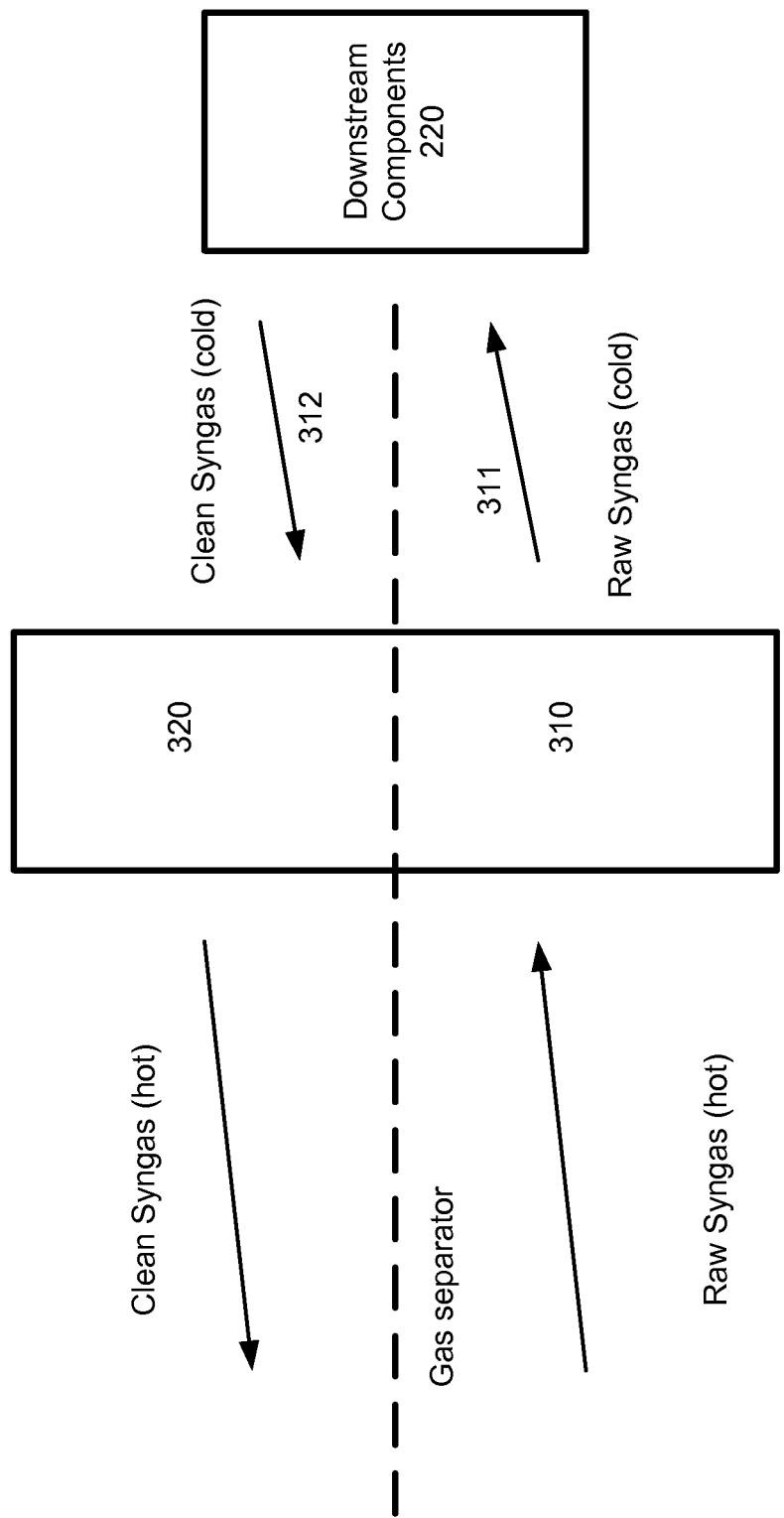

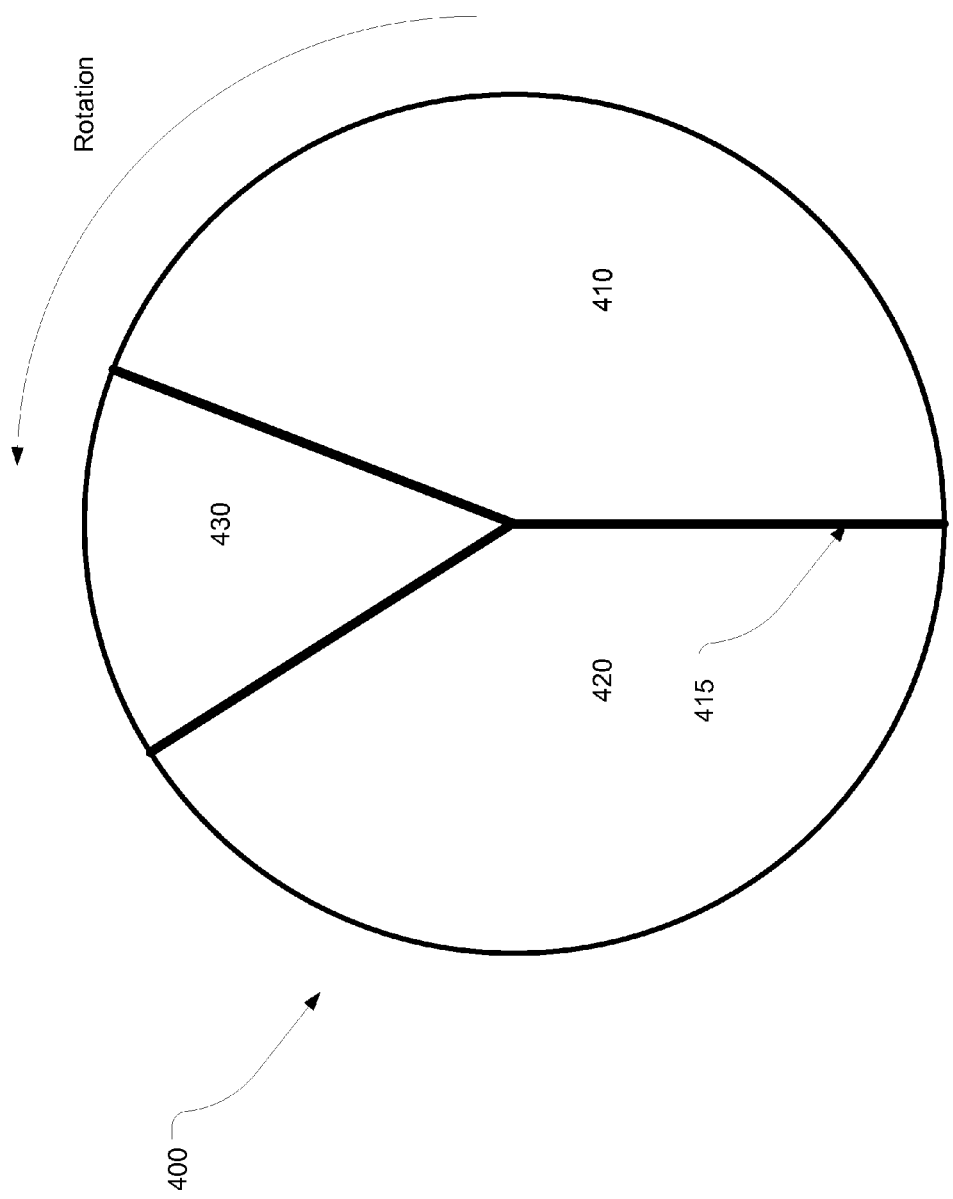

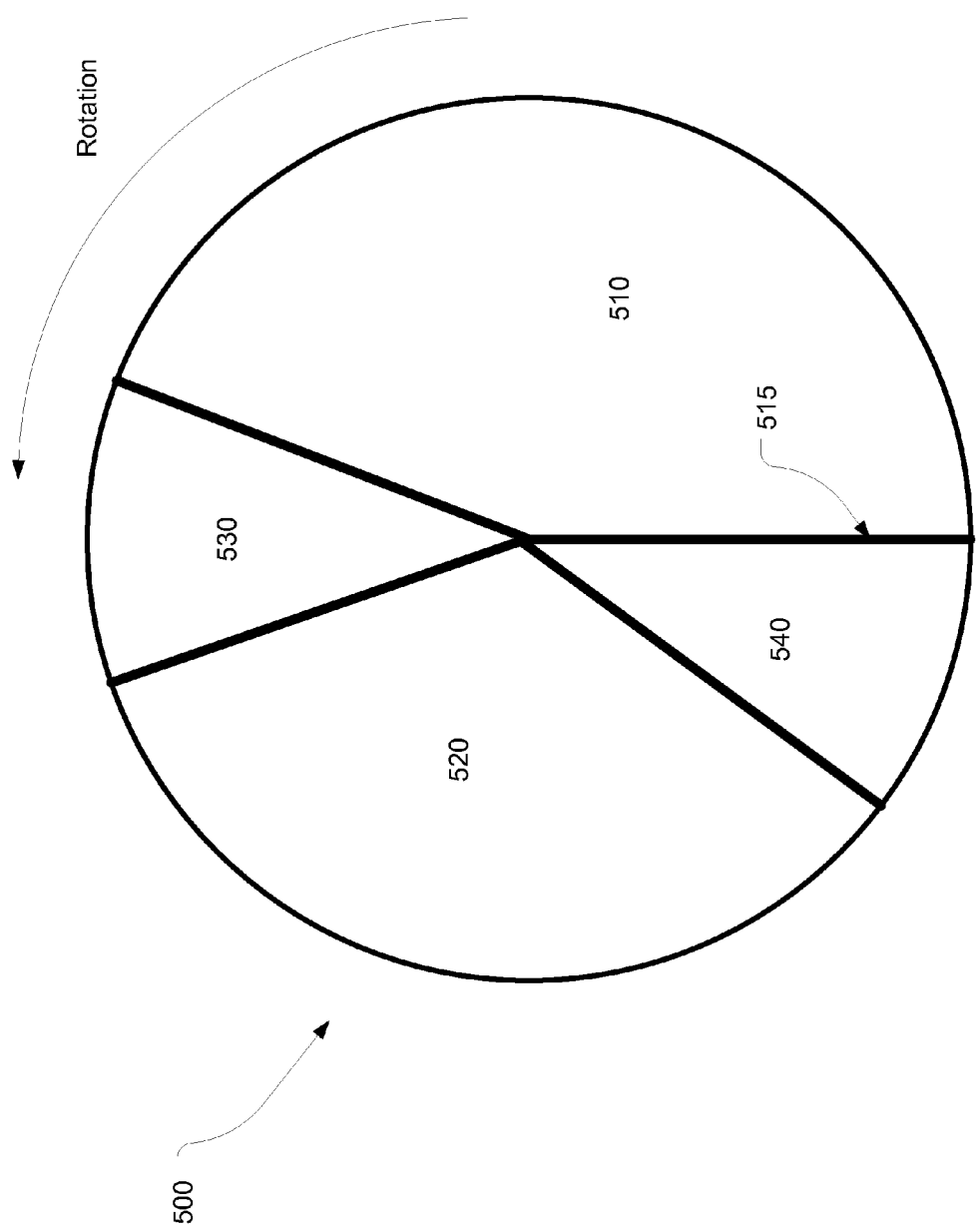

REGENERATOR FOR SYNGAS CLEANUP AND ENERGY RECOVERY IN GASIFIER SYSTEMS

This application claims priority of U.S. Provisional Patent Application 61/181,099, filed May 26, 2009, the disclosure of which is incorporated herein by reference.

BACKGROUND

The generation of waste, particularly solid waste has become an increasingly worrisome environmental issue. Many landfills are becoming filled to the point where additional waste cannot be deposited therein. In addition, much of today's solid waste is not readily biodegradable, implying that the waste will not decompose in a timely manner. As an alternative, incinerators have been employed to burn solid waste, so as to minimize its physical footprint. However, these incinerators burn the waste and generate air pollutants which require very extensive gas cleanup, create ash which can be hazardous and produce energy only in the form of heat which is converted into electricity.

Plasma gasifiers offer an alternative to these current approaches. Plasma gasifiers use intense electrically based heating to enhance a gasification and melting process which produces a synthesis gas (syngas) consisting of hydrogen and carbon monoxide. Inorganic material is converted into a nonleachable glass. After cleaning, the synthesis gas can be converted into a variety of liquid fuels or combusted to produce electricity. Cleaning of the synthesis gas and recovering heat from the syngas can be a key part of the process.

FIG. 1 shows a representative plasma gasifier system. The plasma gasifier system 100 includes a reactor vessel 110, which is typically refractory lined. Within the vessel 110 are two or more electrodes 120a, 120b that are in electrical communication with one or more power supplies 130. In some embodiments, one electrode is suspended from the top of the reactor vessel 110, while the other electrode 120b is located at the bottom of the vessel. The power supplies 130 create a significant electrical potential difference between the two or more electrodes, so as to create an arc between the electrodes 120a, 120b. As waste is fed into the vessel 110 via a waste handler 140, it is exposed to extreme temperatures, which serve to separate the waste into its component parts.

The bottom, or lower portion of the vessel 110 contains molten metal 145. An area above the molten material forms an inorganic slag layer 147. Gasses, such as carbon monoxide and hydrogen gas, are separated and exit the vessel though portal 150. The gas, commonly known as syngas, exits the vessel 110 at an excessive temperature. Since the gas has not been processed, it is also referred to as dirty syngas. The syngas is cooled in a scrubber unit 180 to allow other particulates in the gas, such as carbon or sulfur to precipitate out of the gas. Halogens and acidic materials are also removed from the syngas. The resulting gas is now referred to as clean syngas. The clean syngas can then be used to fuel a boiler or other device.

Despite the advantages of plasma gasifiers, one issue associated with the use of plasma gasifiers is the amount of energy used to raise the temperature of feedstocks, the syngas and the slag. This heat is then lost when the syngas is cooled as it is being cleaned. Recovery of this would increase the economic benefits of plasma gasifiers.

Therefore, in some embodiments, a regenerator or heat exchanger 160 may be used to capture the heat from the dirty syngas as it exits the vessel 110 and transfer it to another medium 170, such as to water to create steam. Heat recovery can also be used for a range of applications in the gasification train, including reducing the heating requirements for final stage removal of tars and other undesirable compounds and for use in powering a turbine. Such a turbine can be used for a variety of applications, including electricity production, and powering pumps, blowers, or compressors for separation of oxygen from air. Although stationary regenerators with extensive valving may be used, it may be advantageous to utilize a moving structure, such as a ceramic structure, due to the high temperatures involved in the process.

However, the use of heat exchangers (also known as regenerators) in waste and biomass gasification systems has been inhibited by the harsh environment in which they must operate. First, the syngas, at the point it passes through the heat exchanger, is not clean. In other words, it still contains particulates and condensables, such as tars and other impurities that can be captured and clog the heat exchanger. Once tars and other particulates collect on the heat exchanger, the flow of gas through the exchanger is compromised, thereby impacting the utility of the device. The honeycomb structures which have been considered for recuperation in other applications do not have sufficiently small microhole structures to capture the particulate matter. In addition, the syngas at this point is at extremely high temperatures, making the selection of a suitable material for a heat exchanger difficult.

In addition, many heat exchangers/regenerators operate by reversing the "hot" and "cold" streams to effectively transfer the heat collected by the exchanger. This often means that the heat exchanger media has to move or rotate to affect this reversal of streams. Movement and sealing of moving parts at high temperatures is often problematic.

Therefore, there is a need for an effective apparatus and method to utilize the heat generated within a plasma gasifier. The apparatus must not only exchange heat, but also tolerate and remove particulate buildup on its surface, while operating at extreme temperatures.

SUMMARY OF THE INVENTION

The problems of the prior art are overcome by the apparatus and method disclosed herein. A rotating or otherwise moving material is used to recover heat from the syngas at it exits the reactor vessel. In some embodiments, three or more streams are passed through the heat exchanger. One stream is the dirty syngas, which heats the rotating material. A second stream is a cold stream which is heated as it passes through the material. A third stream is a cleaning stream, which serves to remove particulates and other deposits that condense on the regenerator material that are collected on the rotating material as the dirty syngas passes through it. This apparatus can also be used as an auto-regenerator (that is, the same material flows through the hot and then cold section of the regenerator), or it can exchange heat between separate flows in the gasifier process. The apparatus can also be used to reduce the heating requirement for the thermal residence chamber (TRC) used downstream from the gasification system, and thereby reduce the amount of syngas that must be oxidized and the amount of oxygen that must be provides in order to heat the TRC.

BRIEF DESCRIPTION OF THE DRAWINGS

FIG. 3A shows one embodiment using a rotating heat regenerator;

FIG. 4 shows a cross sectional view of a rotating heat regenerator according to one embodiment;

FIG. 5 shows a cross sectional view of a rotating heat regenerator according to a second embodiment;

DETAILED DESCRIPTION OF THE INVENTION

Figure 2A:
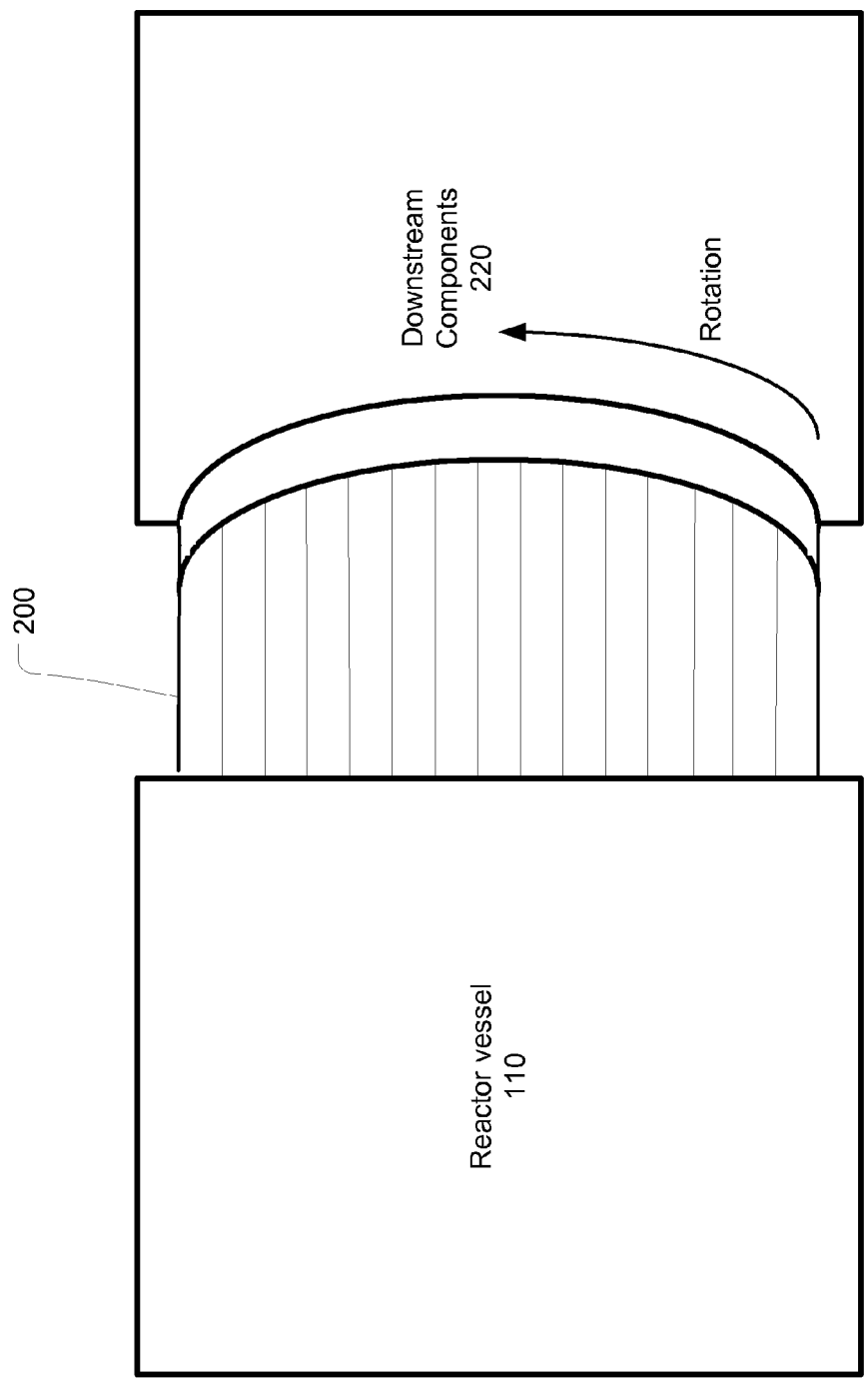
FIG. 2A shows a rotating heat exchanger.
Figure 2B:
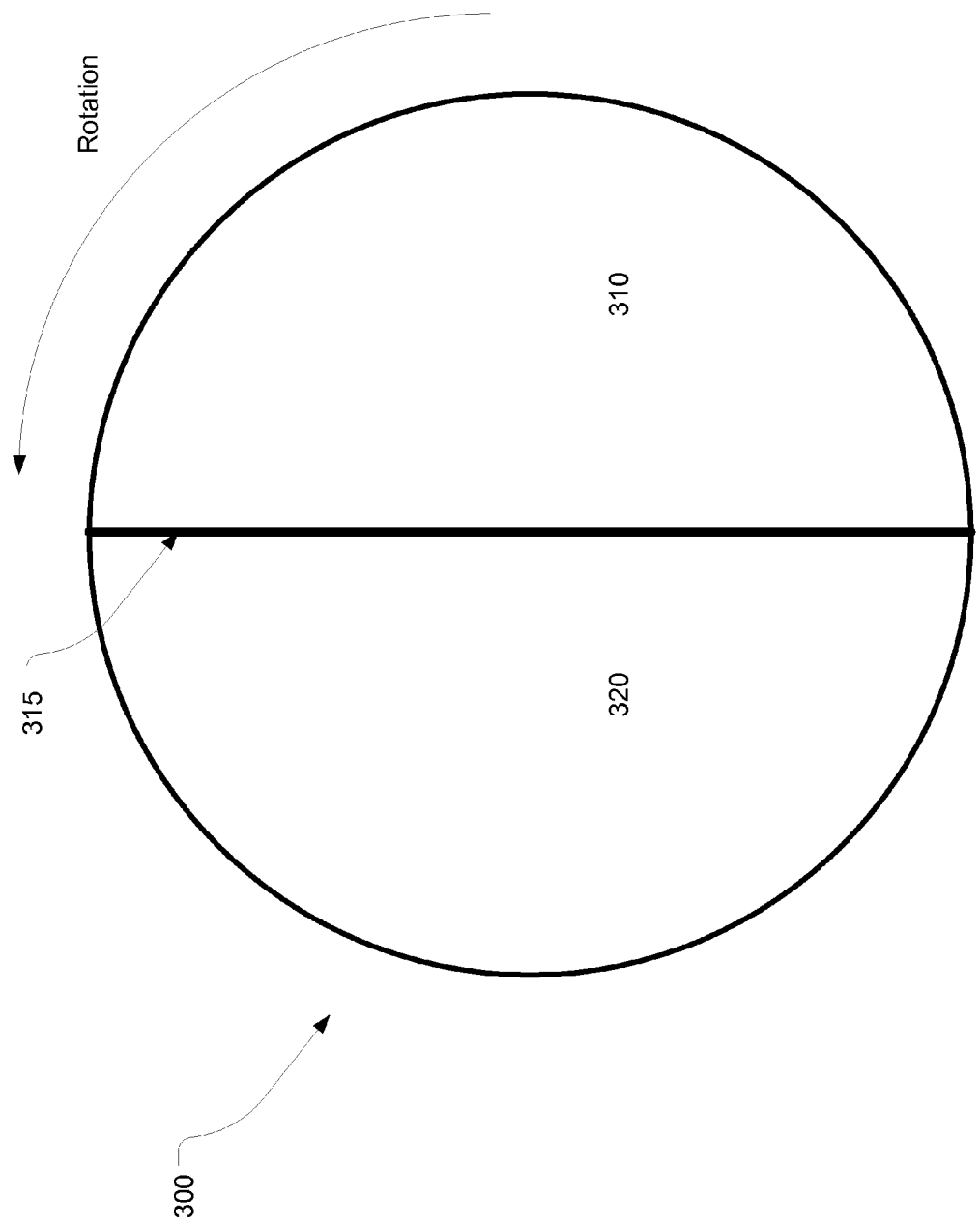
FIG. 2B shows a cross-sectional view of a rotating heat exchanger.

FIG. 2A shows a schematic diagram of a rotating energy exchanger 200. The energy exchanger 200 may be located between the vessel 110 and other downstream components 220. FIG. 2B shows a representative cross sectional view of an energy exchanger 300. The heated stream passes through a portion 310 of the energy exchanger, while a cold stream is passed through a second portion 320. The line 315 between the two portions signifies a wall or other separator that keeps the two flows apart. The heated stream imparts its thermal energy to the first portion 310 of the energy exchanger 300. The energy exchanger 300 is rotated, such that the recently heated portion of the energy exchanger 300 is not used by the heated stream. Instead, the cold stream flows through the heated portion of the energy exchanger, where the energy flows from the thermal mass of the energy exchanger 300 to the cold stream. The net effect is that the heated portion 310 releases its stored heat to the cold stream. Although rotating heat exchangers have been used for heat recovery from clean gas, they have not been used with syngas as it exits a gasifier, where it still contains contaminants and condensables, such as tars and alkalis, or used in an auto-heat exchanger, where the same gas moves through both legs of the energy exchanger. An advantage of rotating energy exchangers is that they do not require valving of the inlet and output of the various legs of the energy exchanger, allowing operation at higher pressures and temperatures. However, this is not intended to limit the invention to only this type of moving energy exchanger.

In some gasifier applications, there is little pressure differential between the multiple flows through the regenerator, thereby minimizing leakage.

In one embodiment, shown in FIG. 3A, the present invention includes an auto-heat exchanger, where the same gas flows through the separate portions of the exchanger 300. For example, the outlet of the gasifier vessel 110 is fed into a first portion 310 of the material and is cooled. After it is cooled, the raw syngas passes through a first flow path 311 and processed by downstream components 220, as described below. The cleaned syngas exits the downstream components 220, and passes through a second flow path 312 and then flows through a second portion 320 of the material, thereby getting heated so as to reach a temperature close to that at which it exited the gasifier 110. In this embodiment, the exchanger 300 may have deposits of tar and slag. The downstream components 220 remove the rest of the particulates, condensables or other undesirable material from the syngas, before it is sent back to the exchanger to be heated. In some embodiments, a cooling element within the downstream components 220 is used to provide a region that is cooled or refrigerated to allow the condensation and precipitation of contaminants from the syngas.

Figure 3B:
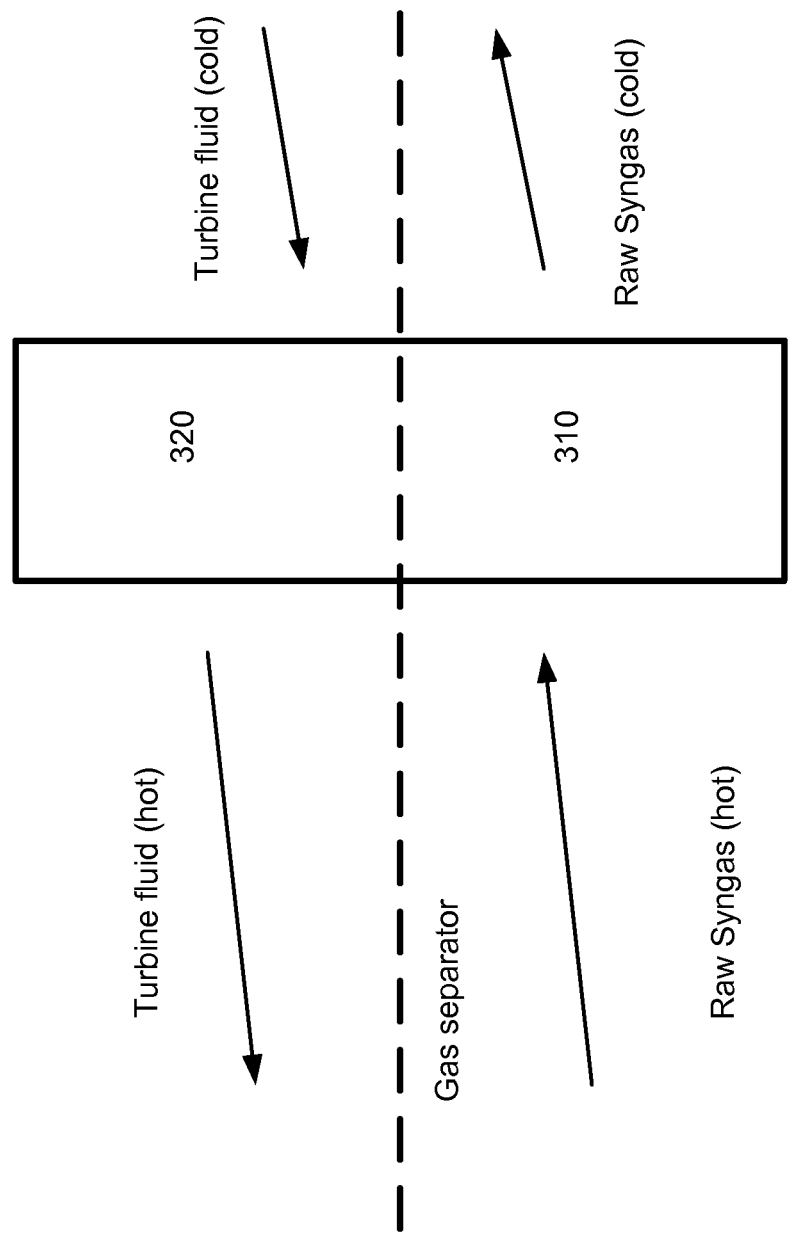
FIG. 3B shows a second embodiment using a rotating heat regenerator.

FIG. 3B shows a second embodiment of a gasifier using the present heat exchanger. In this embodiment, the raw syngas is used to heat the first portion 310 of the heat exchanger 300, as described above. However, rather than sending the clean syngas through the second portion 320 of the heat exchanger 300, a different fluid is used. In some embodiments, the fluid being heated is used to operate a turbine.

In some embodiments, the best thermal performance of the energy exchanger is when the cold fluid flows in the direction opposite from the hot fluid, in order to minimize entropy generation and achieve best thermal recovery efficient.

Honeycomb structures may be used to create the energy exchangers. It is also possible to use monolith structures, similar to those used in diesel particulate filters (DPF). In the case of DPFs, the syngas flows through small pores present in the wall, such that the gas has to flow through a wall, thereby depositing solids upstream from the walls, as is done in conventional DPF filters for automotive applications. In the case of a honeycomb, the tars and/or slag condense in the channels and then precipitate on the walls of the honeycomb.

The energy exchanger 300 can be made from a variety of materials. In some embodiments, cordierite is used. However, there is a temperature limitation of about 1300° C., as indicated in Table 1. The actual temperature limitation may be much lower than this, such as about 700° C., if the material is cycled multiple times. Another attractive material is SiC. This material has a higher maximum temperature and reduced cycling limitations. One drawback of SiC is that it has high thermal conductivity, and thus there is substantial heat transfer along the regenerator, thereby decreasing its efficiency. This limitation is not present if the SiC is discretized in the axial direction, as would be the case when the energy exchanging material is in the form of pellets, having spherical or other shapes. In this case, the high thermal conductivity of the energy exchanging media would be beneficial, as there will small temperature gradients across the energy exchanging material, better using the thermal capacity of the pellets. For gasifier applications, optimal efficiency may not be the most critical characteristic, as there may be other criteria, in particular operational constraints, which drive the operation of these units. In some embodiments, a metallic heat exchanger can be used, however their use may be limited by the reducing nature of the environment.

TABLE 1

Material Characteristics for Energy Exchanger

| PROPERTY | Ceramic | | Metal (e.g. HJS, SMF) |
| --- | --- | --- | --- |
| | Oxide (e.g. Cordeirite) | Carbide (e.g. SiC) | |
| Strength | A-axis Crush 7.93 MPa | A-axis Crush 9.65 MPa | Tensile 40 MPa x-axis 60 MPa y-axis |
| Heat Capacity (@500° C. J/cm³C) | 2.8 | 3.6 | 4.2 |
| Thermal Conductivity (@500° C. W/mK) | 1-2 | 10-30 | ~15 |

TABLE 1-continued

Material Characteristics for Energy Exchanger

| | Ceramic | | |
|---|---|---|---|
| PROPERTY | Oxide (e.g. Cordeirite) | Carbide (e.g. SiC) | Metal (e.g. HJS, SMF) |
| CTE ($\times 10^{-7}/°$ C., 22-10000° C.) | <6 | 45 | 180 |
| Elastic Modulus | 4.8 GPa | 13.3 GPa | elongation at break: 40% x-axis 20% y-axis |
| Maximum temperature | ~1300° C. | ~1600° C. | ~1360° C. |

The thermal mass in the energy exchanger can be a monolith (such as a honeycomb monolith, with or without plugs in alternative channels, as in diesel particulate filters (DPFs)), or it can be a discretized material, such as pellets. As mentioned above, discretized materials have lower axial thermal conduction; axial heat conduction results in decreased performance of the energy exchanger 300. It is important to produce enough surface area, level of turbulence and heat capacity in order to remove the desired energy from the flow. In the case of pellets, they can be relatively uniform sized, or they can be of different sizes in order to increase the filling fraction or the heat transfer from the gas to the solid phases.

In order to assure a thermal gradient along the energy exchanging material in the case of the auto-energy exchanger, a thermal sink needs to be placed in the region between the heated stream and the cold stream, such as in a cooling element of the downstream components 220 in FIG. 3A. In the case of the auto-energy exchanger, this is the region where the flows change direction. The cooling element of the downstream components 220 in FIG. 3A is the coldest region of the energy exchanger. By minimizing heat leaks along the energy exchanger and leakages between the inlet and the outlet legs of the energy exchanger, the refrigeration that needs to be provided to the cooling element in downstream components 220 can be minimized. The temperature in this region will be determined by the efficiency of heat removal from the gas to the solid material, the flow rate, the leakage between the two flows, and the refrigeration power in the cooling element 220.

In another embodiment, the reverse process, where the hot gas is further heated instead of cooled, can also be used. If, instead of refrigeration in downstream component 220, heat is added, the function of the heat exchanger 300 reverses. That is, the hot stream (i.e. the raw or dirty syngas) gets hotter in the first leg of the energy exchanger, while in the return leg the stream (clean gas) gets cooler. As in the case of the previously described embodiment, the temperature at the hot zone (depicted by 220 in FIG. 3A) depends on the leakage, on the thermal conduction, on the heat transfer between the streams and the thermal mass that constitutes the energy exchanger, etc. Instead of depositing the condensable materials, high temperatures can be reached in this configuration to complete reactions that are slow at lower temperature, including conversion of medium and heavy hydrocarbons to hydrogen rich gas and CO. The process can be used to remove some of the contaminants (such as tars and remaining medium and light hydrocarbons), but contaminants like ash and other slag-forming materials (such as sodium) will not be removed from the stream. The temperatures are such that the tars are pyrolyzed or reformed, with or without oxygen. The clean syngas enters the second leg of the heat exchanger, where it is cooled by the incoming dirty syngas and exits the heat exchanger at a temperature comparable to that at which it enters. Thus it is possible to increase the temperature of the syngas to that required for destruction of the tars with a relatively small energy penalty.

In this case, the heating of the hottest zone can be provided through electrical heating, thermal heating, combustion of a fuel (external to the device) or other means. In particular, microwave heating of this section can be an attractive possibility, with antennas/waveguide protected behind a ceramic liner.

The material characteristics of the regenerator can be adjusted to match the local requirements of the regeneration as a function of the location of the heat exchanger 300. Thus, different materials can be used at the region of high temperature rather than lower temperatures, minimizing the cost of the expensive material and increasing the range of materials that can be used. Alternatively or in conjunction with the use of multiple materials, the specific surface (surface area per unit volume) of the regenerator can be altered, with comparable fill fractions, to match changes in physical or chemical characteristics of the flow. This can be achieved by changing the size of pellets, if pellets are used as the material in the regenerator. It is also possible to change the fill fraction, for example, by adjusting the pellet size distribution (using polydispersive pellets, for example). It is not necessary to depend on the use of pellets, as other methods can be used to adjust the specific surface. It is also possible to vary the porosity of the material as a function of the location along the heat exchanger.

Figure 9:
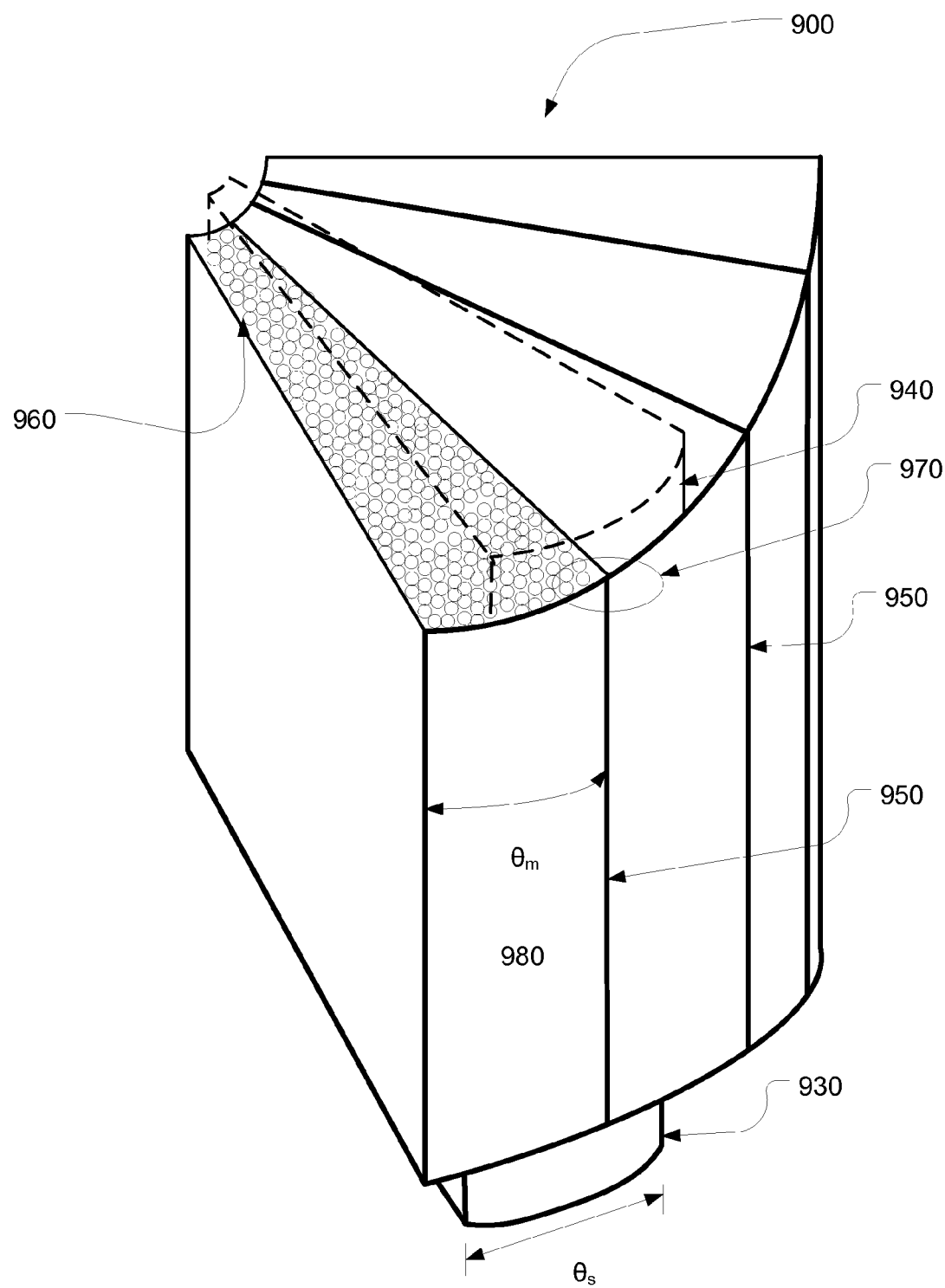
FIG. 9 shows an embodiment using a non-monolithic heat regenerator.

In the case when the rotating element of the heat exchanger is not monolithic, it would be possible for the gas to mix through the heat exchanger, decreasing the efficiency of the system. To prevent excessive mixing, the moving section of the energy exchanger 900 is made in several compartments 980, as indicated in FIG. 9. The energy exchanger 900 has a plurality of these compartments 980, and both the dirty syngas as well as the cleaned syngas flow through multiple compartments. The compartments 980 have walls 950 along the radius that prevent gas flow in the poloidal direction (which would "short-circuit" the exchanger 900) thus preventing mixing between gas introduced in one compartment from mixing with gas in an adjacent compartment. Pellets, or discrete heat-exchanging material 960 fill each of the compartments 980. Mixing from one compartment to another can be prevented by using stationary seals 940, 930 at the top and/or bottom of the rotating heat exchanger, respectively. As shown in FIG. 9, if the poloidal extent $\theta_s$ of the top stationary seal 940 or bottom stationary seal 930 is larger than the poloidal extent $\theta_s$ of the compartment 980, then leakage flow through one compartment 980 can be eliminated. Furthermore, there is always a sealing region 970 present, eliminating the short-circuit route between compartments.

Figure 3C:
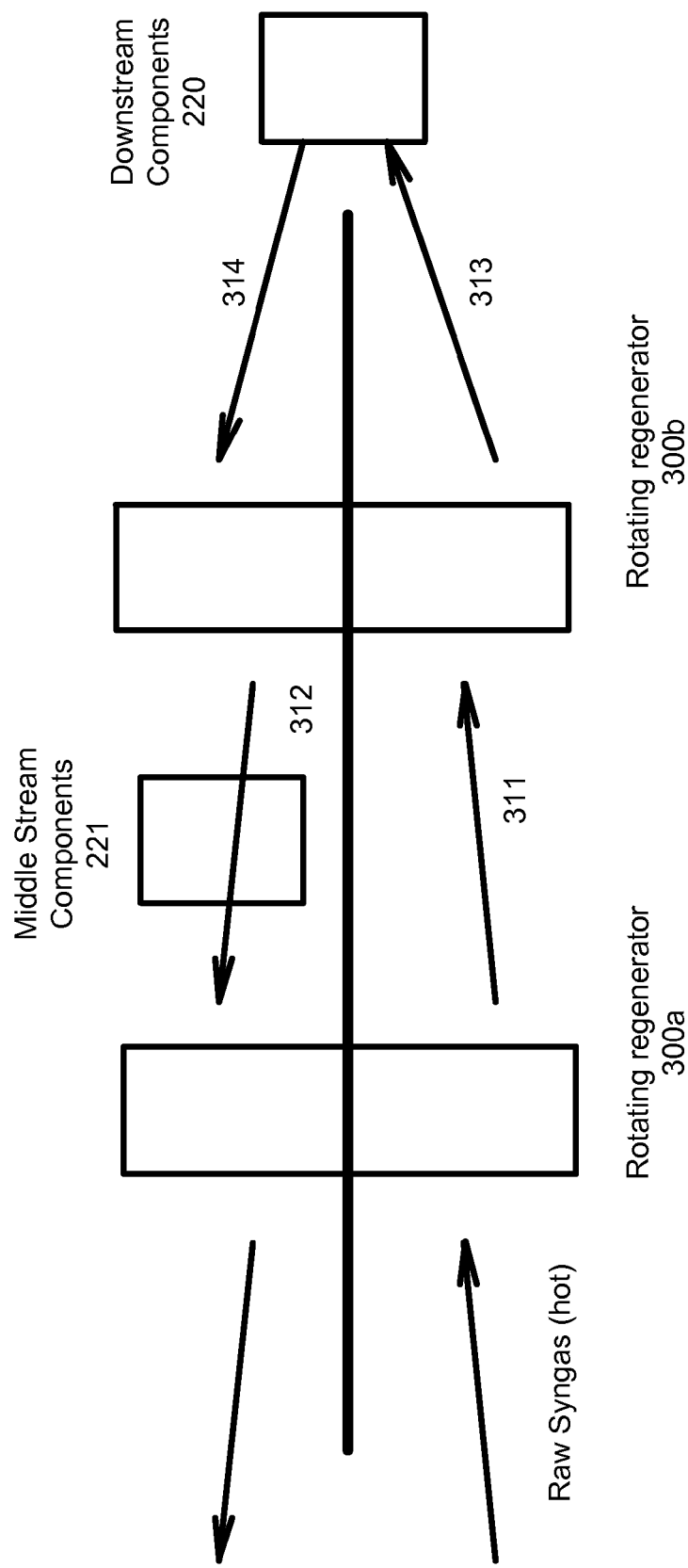
FIG. 3C shows an embodiment using multiple rotating heat regenerators.

It is also possible to utilize multiple regenerators 300a, 300b in series, as shown in FIG. 3C. In this embodiment, raw syngas exits a first portion of exchanger 300a, and passes through first flow path 311. It then enters a first portion of second exchanger 300b. The gas exiting the second exchanger 300b passes through another flow path 313 to downstream components 220. Gas exiting the downstream components 220 then passes through another flow path 314 to a second portion of second exchanger 300b. Gas exiting the second exchanger 300b passes through second flow path 312 and enters a second portion of first exchanger 300a. In one embodiment, the exchangers 300a, 300b may use different materials, depending on the thermal requirements and particulate/condensable content of the syngas. The discrete nature of the heat exchanger shown in FIG. 3C allows for distributed conditioning of the regenerators 300a, 300b. For example, regenerator 300a may need to be regenerated more frequently than regenerator 300b due to its exposure to raw or dirty syngas. Similarly, the technique used to regenerate each regenerator 300a, 300b may be different (i.e. one may use heat while the other uses an oxidizer). In some embodiments, the portion of each regenerator 300a, 300b that is subjected to regeneration may differ. Methods of regenerating the surfaces of the heat exchangers 300 are described in more detail below.

As shown in FIG. 3C, an additional element 221 may be located between rotating regenerators 300a, 300b, such as in flow path 312. This element 221 can be used to introduce conditioning material to a section of the regenerator 300a, or to remove conditioning material from the regenerator 300b. This component can also be used as a heat sink or a heat source, if desired. In some embodiments, multiple middle stream components 221 can exist. For example, middle stream components 221 may be placed in both flow streams 311, 312. Similarly, more than two rotating regenerators can be present. In some embodiments, the regenerators 300a, 300b may be placed in series without middle stream components 221 between them. It is also possible to divert a section of the main flow, such as from flow path 311 or flow path 312, if flows at intermediate temperatures are desired.

In some embodiments, the use of DPF-like structures may be disadvantageous because the velocities of the flows through the system are higher, as only a portion of the available cross section is used in each phase of operation. This is due to the fact that a portion of the channels in the matrix are sealed on one side of the regenerator, while adjacent channels are sealed on the opposite side. This results in non-uniform velocities through the channels; however, the geometry provides for good thermal contact between the gas and the thermal mass while flowing in the microstructures (pores) through the walls between adjacent channels since all gas must flow through the walls.

In the case of DPF-like geometry for the energy exchanger, it is possible to arrange the channels in the regenerator such that they are shaped to allow more uniform flows through the channels. Thus, the cross section of a channel decreases along the channel, moving away from the opening of the channel. Another option is to make the channel cross-sections different for the set of channels with openings on one side of the regenerator. There may be advantages with these geometries depending on the loading of the regenerator by solids/slags/slurries. The objective may be to arrange the asymmetric matrix such that the tars and other solids are deposited on channels with larger cross sections.

Figure 1:
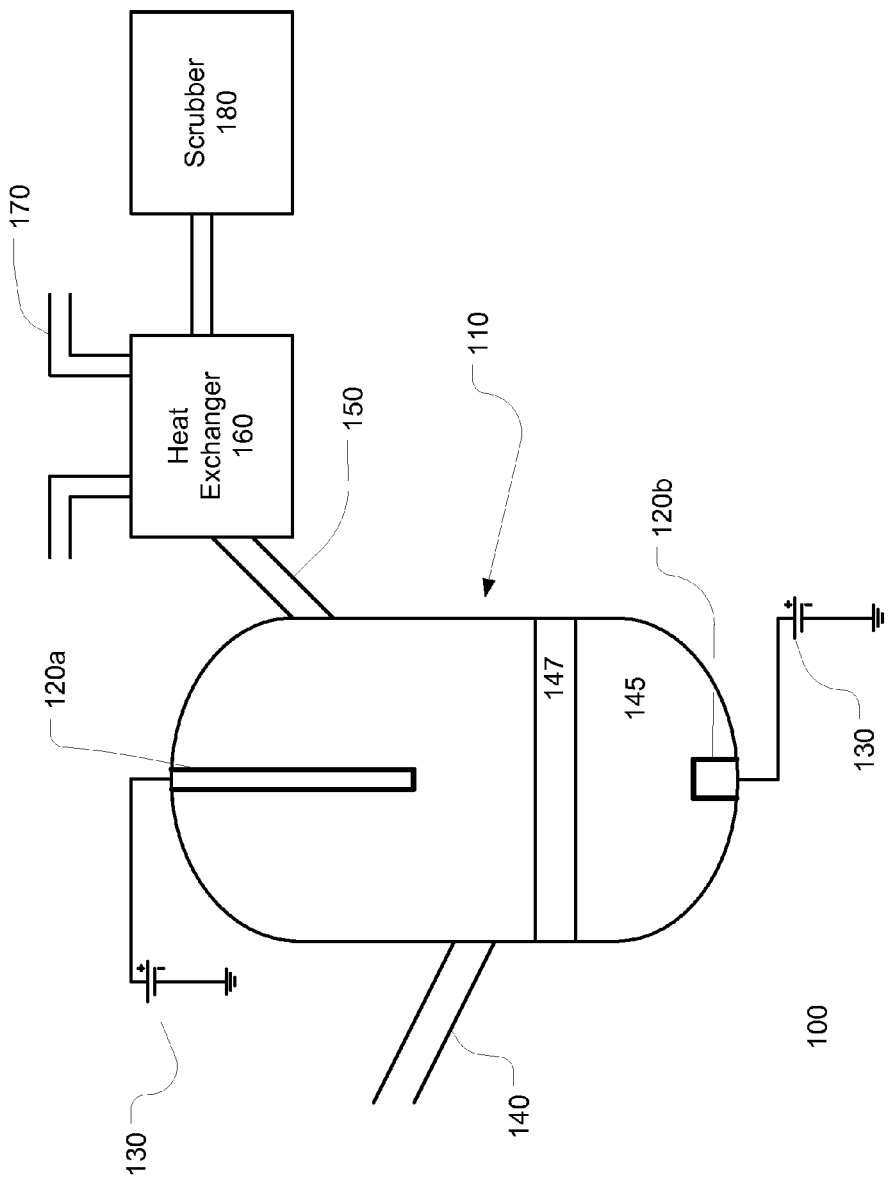
FIG. 1 shows a plasma gasifier system which can be used with the present invention.

It is known that, in some embodiments, gas exiting a gasifier must be cooled in order to remove (through condensation) tars and/or slags. In a region further downstream, the gas may be further cooled to precipitate any remaining tars/slags that were not removed earlier. Referring to FIG. 1, it would be preferable if tars were deposited on the cooler sections of the heat exchanger 160, while the slags, such as alkali metals, were condensed/deposited downstream on a separate surface 180.

The use of two flows through a ceramic honeycomb structure, as shown in FIG. 2B, has been disclosed previously. However, there are substantial advantages, such as for gasifier applications, of utilizing more than two flows.

In some embodiments, as shown in FIG. 4, a third flow, referred to as HX cleaner fluid, may be used. This exchanger 400 utilizes three portions 410, 420, 430. As described with respect to FIG. 2B, hot dirty syngas passes through the first portion 410 and is cooled as it passes through the exchanger 400. A cool stream (either clean syngas, turbine fluid, or another fluid) passes through second portion 420 and is heated by the exchanger 400. The third flow is introduced to clean a portion 430 of the heat exchanger 400. Lines 415 signify walls or other separators in the stationary sections designed to keep the flows separate from one another. In some embodiments, this third flow may involve an oxidizer, such as oxygen or air. At high temperatures, the oxidizer may increase the combustion rates of the tars on the heat exchanger. In other embodiments, the HX cleaner fluid is not an oxidizer and the flow of high temperature gas to enable the evaporation of the slags on the exchanger. In other embodiments, high flow rates are used to remove particulates deposited on the exchanger. This embodiment may be particularly useful when DPF-like geometry is used for heat (energy) exchanger. Thus, the heat exchanger (HX) cleaner is used to remove the particulates and condensables, such as tar, that are deposited on the exchanger, either via combustion or evaporation.

The flow direction of the HX cleaner fluid may be the same as that of the syngas exiting the gasifier. In other embodiments, the flow of HX cleaner fluid may be opposite than of the syngas exiting the gasifier. It is also possible to mix the output from the HX cleaner section with either the dirty syngas, or the cleaned gas. If mixed with clean gas, this can happen at any point along the gasification process. In other embodiments, it is not necessary to return the flow from the HX cleaner portion to the syngas. For example, if slags are deposited on the heat exchanger, or tars are simply re-evaporated, it may be desirable to keep this flow separate from the cleaned syngas.

The flow rate of HX cleaner gas may be separately controlled. For example, the flow may be continuous, or used only as needed, depending on the deposition rate and/or total deposited amount of tars and other particulates. In some embodiments, the amount of particulate deposited on the filter 400 is measured and the flow rate is determined based on this measurement. In other embodiments, a constant flow rate may be used.

During operation, the regenerator 400 is rotated in discrete steps. It is possible to move the regenerator in such a manner that, over time, all portions of the regenerator 400 are exposed to the HX cleaner, thereby allowing for the cleaning of the entire regenerator. In some embodiments, the amount of rotation per time step may be constant. In other embodiments, the amount of rotation is varied. This embodiment allows selective cleaning of the regenerator. Sensors may be used to determine the loading and requirement for cleaning of a particular portion of the regenerator. The use of sensors that locally determine the loading in the regenerator matrix may improve the operation of the regenerator by cleaning the dirtiest portions at any given time. Multiple sensor technologies may be used, including microwave sensing as disclosed in U.S. Patent Publication 2008/0059093, optical sensing, pressure based sensing or flow based sensing, or other sensing methods.

The regenerator can be used with varying gasification rates and flow rates. There are various parameters that can be adjusted, including the speed of rotation of the regenerator, the stationary (or dwell) time, and the ratio of the stationary time to the time of rotation. The stationary time can be determined by calculating the dwell or residence time of any of the multiple flows passing through the regenerator. For example, it may be desirable to maintain contact between the HX cleaner fluid and a section of the regenerator for a given amount of time to allow regeneration. The required stationary time can be determined based on mass, heat, or chemical kinetics transfer rates.

Because a fraction of the heated portion 410 is placed in the third stream, there may be a loss of efficiency, depending on the frequency at which the filter needs to be cleaned. This configuration may be particularly attractive when the enthalpy requirement of the cold stream is lower than that which can be provided by the hot stream, such as because of different compositions or flow rates.

As described above, in some embodiments, the raw syngas flow is not the hot stream, as the return stream may be even hotter. The use of HX cleaner fluid is also possible in this reverse configuration.

Furthermore, the present invention is not limited to one hot stream, one cold stream and one cleaner stream. For example, FIG. 5 shows a configuration in which there are two cold flow streams 520, 540, a hot stream 510 and a cleaner stream 530. The two cold streams 520, 540 have different cross sectional areas in the regenerator 500 in this embodiment. The cross sectional areas in the regenerator 500 are selected based on the enthalpy flow requirements of each stream. For example, one may have a flow rate greater than the other. Alternatively, they may be comprised of fluids having a different specific heat. In another embodiment, the desired final temperature may be different for the two streams 520, 540. In other embodiments, the cold streams 520, 540 may have the same cross-sectional area and have identical enthalpy flow requirements. As described above, the regenerator is rotated such that all portions of the exchanger 500 eventually are exposed to the HX cleaner stream.

Figure 6:
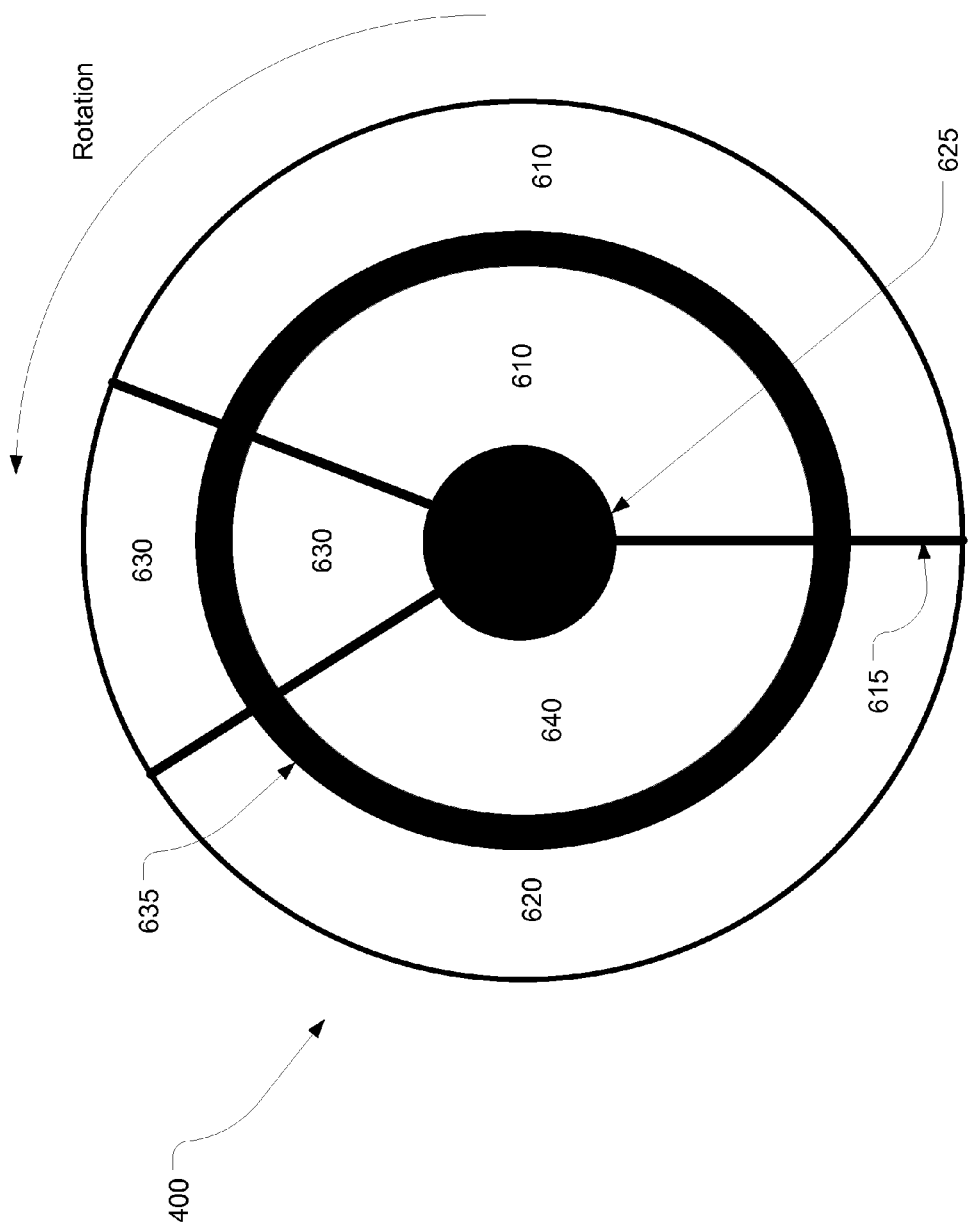
FIG. 6 shows a cross sectional view of a rotating heat regenerator according to a third embodiment.

FIG. 6 shows a second embodiment with multiple cold streams 620, 640, a hot stream 610 and a cleaner stream 630. In this embodiment, the cold portions 620, 640 are created radially, rather than poloidally. Dirty syngas passes through first portion 610 (which extends on either side of separator 635). The cold streams pass through portions 620, 640. As before, a cleaner portion 630 (which also extends on either side of separator 635) is used to clean the regenerator 600, as needed. In the center of the regenerator 600 may be a shaft or thermal insulator 625.

Although two cold streams are shown, it is within the scope of the disclosure to use more than two. In addition, there may be multiple hot streams and multiple HX cleaner streams. As stated above, the temperatures and flow rates of the cold streams do not need to be the same. Specific enthalpy requirements can be met by selecting the appropriate cross sectional area for each stream and appropriate choosing of the return temperatures. This may be the case in gasifiers, and particularly waste or biomass gasifiers, where there are multiple flows with multiple temperatures and throughputs.

In some applications, it would then be possible to mix the two separately heated streams downstream from the heat exchanger 600, thereby simplifying the plumbing requirements. It may also be possible to provide limited turbulence in the region downstream from the heat exchanger 600 in order to improve mixing of the two cold streams, upstream from the TRC unit.

There is a pressure gradient limitation to the use of rotating regenerators, as the seals may allow some flow across regions. The present invention avoids this problem as there is not expected to be significant pressure difference between the dirty syngas (hot stream) and the clean syngas (cold stream). The pressure of the HX cleaner fluid should be comparable to these pressures.

It is possible to use components at the lower temperature of downstream components 220 or 221 that are not available at the higher temperature, such as pumps. Re-pressuring pumps can be placed downstream from any gas cleaning components in 220.

For turbine applications, the allowable pressure differential in the different streams may be as high as 4 bar. One advantage of its use as a heat transfer media for gasifiers is that there is little pressure differential in the multiple flows across the regenerator, thereby minimizing leakage. In addition, for gasifier applications, minor leakage is acceptable.

Another advantage of having a HX cleaner section is that by operating this section at a pressure slightly higher than either or both the hot or cold streams, it is possible to minimize leakage from the dirty syngas to the clean syngas. Leakage may compromise the cleanliness of the syngas and could make difficult its application directly to a turbine or to a catalyst.

There are multiple techniques that can be used to add thermal energy to the section of the energy exchanger that is undergoing regeneration. This can be achieved, as described above, by using heated cleaner fluids, by using combustion of the cleaning fluid, with the combustion occurring either external or internal to the section of the energy exchanger that is undergoing regenerations. In other embodiments, electrical means are used to add thermal energy to the section of the energy exchanger undergoing regeneration. In one embodiment, microwave heating is applied to this section, with the use of microwave antennas or waveguides that are located behind a liner.

The regenerators in gasifiers can achieve multiple objectives. First, by removing the tars from the syngas in the regenerator, the need for subsequent syngas cleanup is reduced. The use of a separate oxidizer or HX cleaner fluid for removing the tars from the heat exchanger minimizes the use of oxidizers in the TRC needed to remove the tars from the bulk. Furthermore, by removing the tars from the syngas and oxidizing them separately with a different flow, it is possible to substantially decrease the energy required to eliminate tars. Additionally, the regenerator can be used to heat up the lower temperature flows upstream from the TRC, minimizing the heat input to the TRC. The use of a ceramic heat regenerator, allows the use of the high temperatures in the raw syngas, without the need to quench it.

The regenerator can be used in conjunction with a turbine. The turbine may be used to compress gasses upstream, for the air-separation unit, or to generate electricity (either for internal use or for sale). It can also be used to provide power to other rotating equipment, such as blowers.

Turbines typically need clean syngas to operate, as shown in FIG. 3A, or a separate fluid, such as helium, as shown in FIG. 3B. The regenerator cools the dirty syngas and warms the fluid that runs through the turbine. Because of the need for seals (due to the rotational nature of the regenerator), there may be leakage between the hot and cold streams. In some embodiments, the pressure of the stream toward the turbine may be as high as 4 bar. Thus, if the gasifier is operated at or near atmospheric pressure, it is expected that turbine fluid may leak to the hot stream. In some embodiments, this leakage is acceptable, as the leaked gas simply passes through the hot stream path a second time. Thus, if the pressure in clean stream is at or above that of the dirty stream, the leakage can be assured to be from the clean stream to the dirty stream, thereby minimizing contamination of the clean stream.

Using the turbine with a gas other than syngas may have the advantage that the requirement of the syngas may be relaxed. It may also be beneficial to operate the turbine with a gas that has increased thermal efficiency, such as helium. However, in some embodiments, such as when the turbine fluid is helium, it may be necessary to recover this gas from the syngas. In these embodiments, it may be desirable to use a separate heat exchanger, such as one without rotation which has no leakage.

The present approach is attractive in that the temperature of the clean syngas may be substantially higher than what is needed for manufacture of liquid fuels (alcohols, Fisher Tropsch). It is possible to use the enthalpy of the gas for other processes, and introduce the cooled syngas into the catalytic reactor for making liquid fuels. For example, downstream components 220 could also include catalysts, located downstream from the syngas cleaning unit, which is also located in the downstream component 220, for the manufacture of liquid fuels from the syngas. The chemical process may be endothermic, and the heat of the syngas can be used to drive the process. Some chemical processes have the best results (in terms of selectivity and conversion) at temperature substantially colder than the temperature of the syngas as it leaves the gasifier, and the present invention allows use of the process without having to waste the heat in the process. It may be possible to also separate the product from the syngas by absorption, adsorption or simply by phase change, and only return the unreacted components through the heat exchanger. It should be understood that the middle stream element 221 could be used instead of the downstream component 220 for this purpose, with a temperature higher than that of downstream component 220. This arrangement is useful when the temperature required for the cleaning process of the gas is lower than the temperature needed for driving the desired chemistry in element 221.

Desirable chemistry in downstream components 220 or 221 can also be driven in cases when the regenerator is used to add additional temperature to the syngas. Already mentioned is the pyrolysis of the tars. Other desirable chemistry can take place at the higher temperature, either endothermic or exothermic.

In FIGS. 3A and 3B, it is possible that the exit temperature of the raw syngas exiting portion 310 may still be relatively hot. In this case, it may be possible to run a second turbine with steam. It may also be possible to recover additional energy through the use of a second heat regenerator, as shown in FIG. 3C. Since the syngas temperatures are lower, conventional heat exchangers, such as Heat Recuperator Steam Generators (HRSG) may be used.

Figure 7:
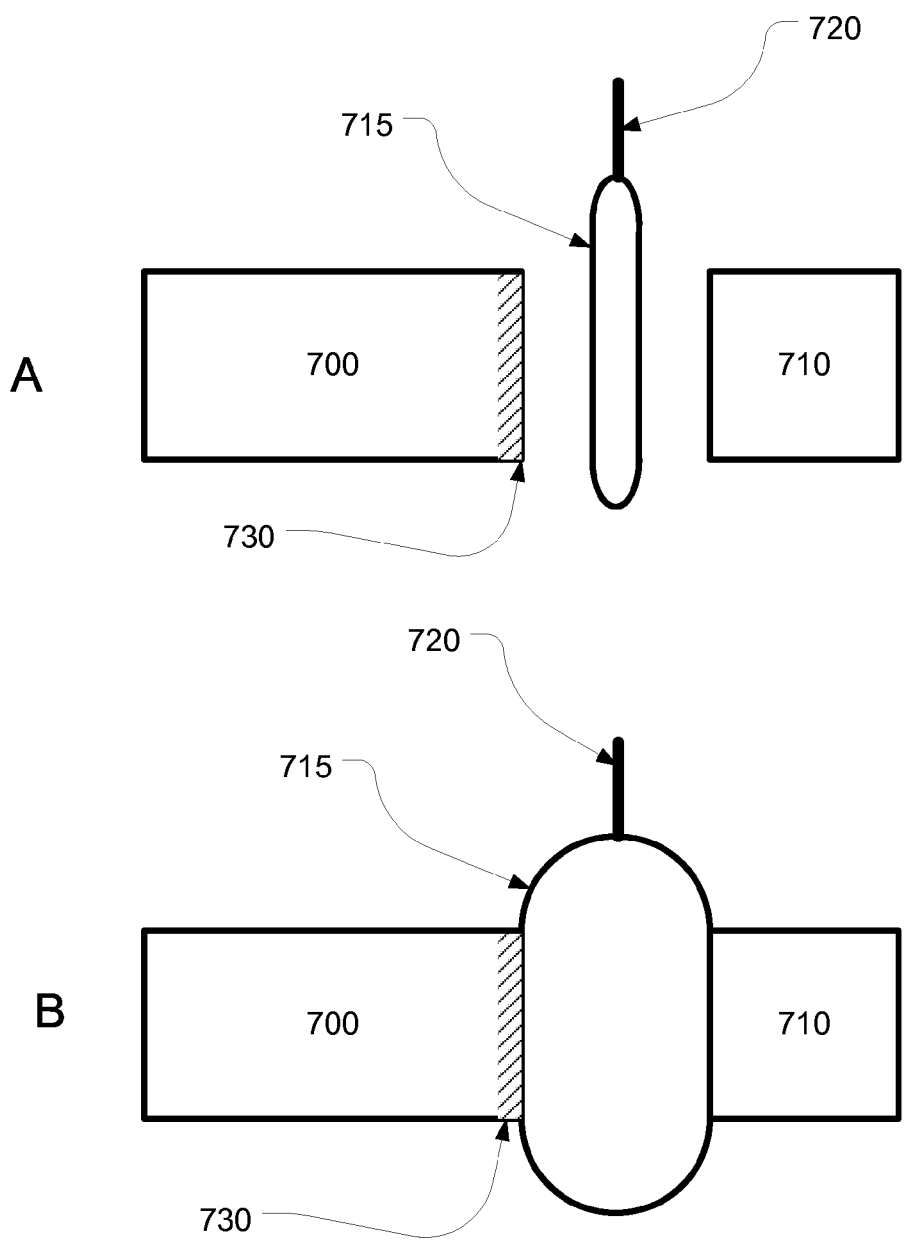
FIGS. 7A-B shows a first embodiment of a seal that can be used with the rotating heat regenerator.

Rotating regenerators require seals that allow rotational movement at times, yet form seals when the regenerator is stationary. In addition, the present seals may be required to operate at elevated temperatures. One potential seal is a bladder that is located across the surfaces that need to be sealed, as shown in FIGS. 7A-B. The bladder 715 may be depressurized, as shown in FIG. 7A. In this case, there is space between the rotating element 700 and the fixed element 710, and therefore the regenerator can be rotated. Once the regenerator has been rotated the desired amount, the bladder 715 can be pressurized, such as by putting fluid into the bladder through port 720. This causes the bladder 715 to expand in size, allowing it to contact the rotating element 700 and the fixed element 710, as shown in FIG. 7B. In some embodiments, the port 720 is located in a colder temperature region, away from the extreme heat of the gasifier.

There are various types of seals. At lower temperatures, it may be possible to use bladders 715 made of materials such as steel or other conventional metals. At higher temperatures, such as above 1200° C., refractory metals may be required. Various metals and alloys may be used. As the atmosphere may be reducing in nature, appropriate choice of material is required.

As an alternative to the use of very high temperature seals, it may be possible to maintain the seal at a lower temperature than the surroundings. Because there is limited heat transfer between the gas and the bladder 715, the heat transfer is mainly due to conductive heat transfer through the elements 700, 710. Through appropriate design, it is possible to sufficiently cool the bladder to allow the use of more conventional materials for the bladder. For example, low thermal conductivity material 730 can be added in the periphery of the regenerator, or axially to the moving element of the regenerator in order to limit the heat transfer to the sealing region.

Figure 8:
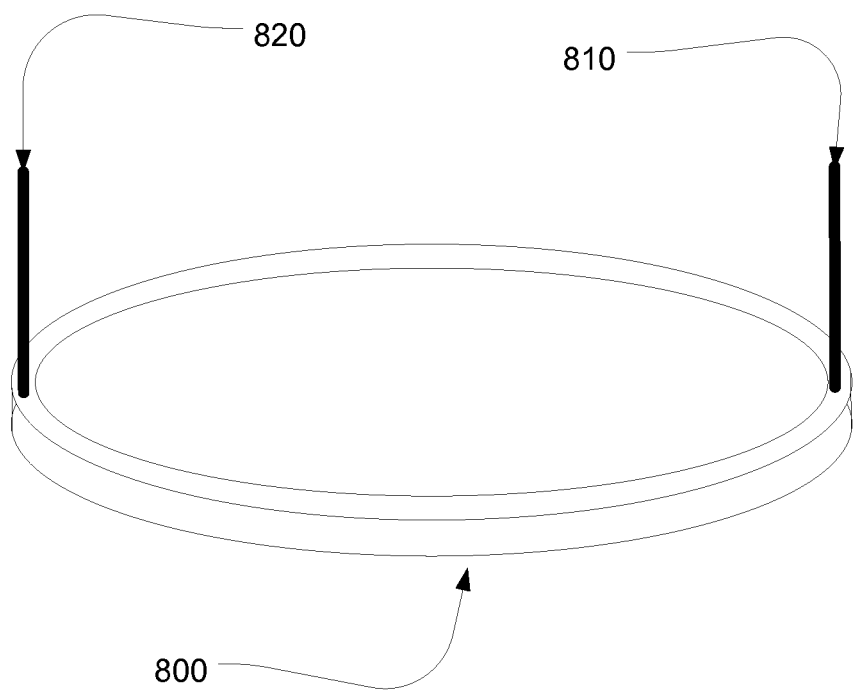
FIG. 8 shows a second embodiment of a seal that can be used with the rotating heat regenerator.

In another embodiment, the bladder itself can be cooled by flowing fluids or gases therethrough. FIG. 8 shows a circumferential bladder 800 with two ports 810, 820. Cool fluid or gas is added in port 810, and hot fluid or gas is removed from port 820. Additional ports can be used as well. Although a circumferential bladder is shown, this concept is equally applicable to other shapes.

Several embodiments are disclosed. Those of the art will recognize that the present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A gasification system, comprising:
a reactor vessel for producing raw syngas;
a primary energy exchanger including a first portion and a second portion, the first portion in fluid communication with the reactor vessel for receiving raw syngas from the reactor vessel, the primary energy exchanger configured to collect therein particulates or condensables from the raw syngas, wherein the primary heat exchanger is configured as a rotating heat regenerator;
a first flow path in fluid communication with the first portion for transporting syngas exiting the first portion out of the primary energy exchanger;
a downstream component in fluid communication with the first flow path and configured to change a temperature of syngas received from the first flow path;
a second flow path in fluid communication with the downstream component for directing the syngas received from the first flow path toward the second portion of the primary energy exchanger; and
a sealing element disposed between a rotating element of the rotating heat regenerator and a fixed element of the gasification system, wherein the sealing element is an expandable bladder configured to be provided from a deflated state in which a space exists between the rotating element and the fixed element to an inflated state in which the expandable bladder contacts the rotating and fixed elements.

2. The gasification system of claim 1, wherein the downstream component is further configured to remove additional particulates from the syngas exiting the first portion.

3. The gasification system of claim 2, wherein the downstream component comprises a cooling element configured to reduce the temperature of the syngas received from the first flow path to allow particulates and condensables to precipitate.

4. The gasification system of claim 2, wherein the downstream component comprises a heating element configured to increase the temperature of the syngas received from the first flow path to allow pyrolysis of particulates.

5. The gasification system of claim 2, wherein the downstream component comprises catalysts adapted to commence chemical reactions with the syngas received from the first flow path.

6. The gasification system of claim 1, further comprising a second energy exchanger, positioned in series with the primary energy exchanger.

7. The gasification system of claim 6, further comprising a middle stream component located between the primary energy exchanger and the second energy exchanger.

8. The gasification system of claim 7, wherein the middle stream component is configured to introduce conditioning material to the second flow path.

9. The gasification system of claim 1, wherein the primary energy exchanger includes a thermal mass.

10. The gasification system of claim 9, wherein the primary energy exchanger is configured to cause a portion of the thermal mass to be heated by syngas passing through the first portion and cooled by syngas passing through the second portion.

11. The gasification system of claim 9, wherein the thermal mass is configured to allow the particulates or condensables to be deposited on the thermal mass, the primary energy exchanger further comprising a third portion configured for cleaning the thermal mass.

12. The gasification system of claim 9, wherein the thermal mass includes a honeycomb structure, a monolith structure, or pellets.

13. The gasification system of claim 1, wherein the expandable bladder includes a first port for flowing a gas or fluid into or out of the expandable bladder for providing the expandable bladder into the inflated state or the deflated state.

14. The gasification system of claim 13, wherein the expandable bladder further includes a second port for circulating gas or fluid through the expandable bladder for maintaining a temperature of the expandable bladder.

* * * * *